United States Patent [19]

Speca

[11] 4,119,773

[45] Oct. 10, 1978

[54] OLEFIN POLYMERIZATION CATALYST

[75] Inventor: Anthony N. Speca, Cincinnati, Ohio

[73] Assignee: National Distillers and Chemical Corporation, New York, N.Y.

[21] Appl. No.: 808,942

[22] Filed: Jun. 22, 1977

[51] Int. Cl.$^2$ .............................................. C08F 4/02
[52] U.S. Cl. .................................... 526/130; 252/430; 252/431 C; 526/96; 526/97; 526/105; 526/106; 526/129; 526/134; 526/156
[58] Field of Search ............... 252/430, 431 R, 431 C; 526/96, 97, 105, 106, 129, 130, 134, 156

[56] References Cited

U.S. PATENT DOCUMENTS 3,622,521 11/1971 Hogan et al. .......................... 526/96
3,984,351 10/1976 Rekers et al. ......................... 526/129

Primary Examiner—Edward J. Smith
Attorney, Agent, or Firm—Kenneth D. Tremain

[57] ABSTRACT

An olefin polymerization catalyst is prepared by depositing the chromium (III) compound obtained from the reaction of a chromium (III) carboxylate with an aluminum alkoxide upon an inorganic support material and calcining the impregnated support material in a non-reducing atmosphere above 300° C, up to the decomposition temperature of the support material to provide an activated catalyst.

15 Claims, No Drawings

OLEFIN POLYMERIZATION CATALYST

BACKGROUND OF THE INVENTION

1. Field of the Invention

This invention relates to the field of olefin polymerization catalysts, and more particularly, to supported catalysts impregnated with chromium (III) compounds.

2. Description of the Prior Art

Numerous olefin polymerization catalysts are known which utilize a chromium (III) compound in their preparation. The low pressure, high molecular weight olefin polymerization process of U.S. Pat. No. 3,008,943 employs the reaction product of an alcoholate, benzoate or acetylacetonate of chromium with titanium tetrachloride. The unsupported olefin polymerization catalyst of U.S. Pat. No. 3,152,105 is thought to be the reaction product of water, a chromous or chromic carboxylic acid salt and either a trialkylaluminum or a dialkylaluminum hydride. It is believed that the water preferentially reacts with the alkylaluminum compound and the product resulting from this reaction then reacts with the chromous or chromic carboxylic acid salt. U.S. Pat. No. 3,311,596 describes the polymerization of olefins using as catalyst, chromium (III) acetylacetonate. The olefin polymerization catalyst of U.S. Pat. No. 3,349,067 is prepared by oxidizing a chromium (III) acetylacetonate which has been deposited on a carrier to at least partly decompose the compound to chromium oxide wherein at least part of the chromium is in the hexavalent state. According to U.S. Pat. No. 3,392,162, an olefin polymerization catalyst is prepared by milling an organo-alkali metal compound such as butyllithium or sodium aluminum dodecyl in a suitable medium, e.g., diesel oil, with a chromium (III) compound such as chromium (III) acetylacetonate or chromium (III) bromide. U.S. Pat. No. 3,622,522 describes an olefin polymerization catalyst prepared from an organo-gallium and/or organo-tin compound, a chromium (III) compound such as chromium (III) dodecoxide or chromyl (III) methylcyclopentoxide, and a titanium-containing compound. U.S. Pat. No. 3,950,303 describes the preparation of filled polyolefins by reacting an olefin in the presence of a filler upon which there is deposited a chromium (III) compound such as: a $C_1$ to $C_{12}$ ester of chromium, e.g., chromium acetate, chromium oxalate, chromium octoate and chromium sulfate; $[Cr(NH_3)_5Cl]Cl_2$; $[Cr(NH_3)_6]Cl_3$; hexaurea chromium (III) fluorosilicates $[Cr(CON_2H_4)_6]_2 \cdot (SiF_6)_3 \cdot 3H_2O$; fumarato-chromium (III) nitrates; methacrylato-chromium hydroxide; and methacrylatochromium chloride. The supported chromium (III) compound olefin polymerization catalyst of U.S. Pat. No. 3,953,413, e.g., chromium (III) acetylacetonate on silica, is activated by heating at about 850°–2000° F. in a nonoxidizing atmosphere. U.S. Pat. No. 3,959,178 describes a mixed olefin polymerization catalyst in which two portions of a support impregnated with a chromium (III) compound, for example, chromium (III) acetylacetonate, are each activated at temperatures which are at least 200° F. apart, with the combined activated portions thereafter being treated with a hydrocarbyl aluminum hydrocarbyloxide. The mixed olefin polymerization catalyst of U.S. Pat. No. 3,998,996 is prepared by reacting a chromium (III) compound containing water of crystallization such as a hydrated chromium (III) halide, sulfate or carboxylate, with a metal alcoholate and mixing the resulting complex with an activator.

None of the aforementioned patents disclose or suggest an olefin polymerization catalyst prepared with the reaction product of a chromium (III) carboxylate and an aluminum alkoxide as hereinafter more fully described.

SUMMARY OF THE INVENTION

It has been discovered that alpha-olefins can be polymerized at high levels of productivity (measured as grams of polyolefin produced per gram of catalyst) employing as catalyst a supported chromium (III) compound obtained from the reaction of a chromium (III) carboxylate and an aluminum alkoxide. Following impregnation of the catalyst support material with said chromium (III) reaction product and prior to calcination, the catalyst can be modified with an additional quantity of an aluminum alkoxide to provide a catalyst which promotes the formation of olefin polymers of desirably high melt indices.

The terms "olefin" and "alpha-olefins" as used herein refer to the monomers which can be polymerized with the supported chromium (III) catalysts of this invention and include alpha-olefins with 2 to 10 carbon atoms and 1 or 2 ethylenic linkages such as ethylene, propylene, n-butylene-1, isobutylene, alpha-methylstyrene, 2-, 3- or 4-methylstyrene, butadiene-1,3, isoprene, 2-phenylbutadene-3,3 and 2,3-dimethylbutadene-1,3. It is also within the scope of this invention to copolymerize the aforesaid alpha-olefins with minor amounts up to 50% by weight of other ethylenically unsaturated monomeric polymerizable compounds. Suitable comonomers are: halogenated styrene; styrene sulfonic acid; alpha, beta-unsaturated carboxylic acids such as acrylic acid and methacrylic acid; esters of acrylic acid with alcohols of from 1 to 8 carbon atoms such as methyl acrylate, ethyl acrylate, and n-butyl acrylate; esters of methacrylic acid with alcohols of from 1 to 8 carbon atoms such as methyl methacrylate and tertiary butyl acrylate; vinyl esters of alcohols with 1 to 10 carbon atoms such as vinyl acetate, vinyl propionate and vinyl benzoate; vinyl esters of alcohols with 1 to 4 carbon atoms such as vinyl methyl ether and vinyl n-butyl ether; vinyl chloride; vinylidene chloride; nitriles and amides of alpha, beta-unsaturated carboxylic acids such as acrylonitrile and methacrylonitrile; acrylamides; methacrylamide; vinyl ketones with 4 to 7 carbon atoms such as methyl vinyl ketones and isopropenyl vinyl ketone; N-vinyl compounds such as vinylpyrrolidone; vinyl caprolactam, vinylimidazole and vinyl carbazole; fumaric acid, maleic acid, maleic anhydride, maleic imide; esters of maleic acid with 1 to 6 carbon atoms such as diethyl maleate, dimethyl maleate, di-n-butyl maleate and the corresponding esters of fumaric acid.

DESCRIPTION OF THE PREFERRED EMBODIMENTS

The inorganic support materials which are useful in the present invention include those normally employed in supported chromium catalysts and in olefin polymerizations such as those described in U.S. Pat. No. 2,825,721. Typically, these support materials are inorganic oxides of silica, alumina, silica-alumina mixtures, thoria, zirconia and comparable oxides which are porous and have a medium surface area. Preferred support materials are silica xerogels or xerogels containing silica as the major constituent. Especially preferred are the silica xerogels disclosed and claimed in U.S. Pat. Nos. 3,652,214, -215 and -216 which are incorporated by reference herein. These silica xerogels have a surface area in the range of 200 to 500 m²/g, a pore volume greater than about 2.0 cc/g, a major portion of the pore volume being provided by pores having diameters in the range of 300 to 600 A.

The chromium (III) carboxylates which are reacted with aluminum alkoxides in accordance with this invention are themselves prepared from carboxylic acids or carboxylic acid salts of from 1 to about 30 carbon atoms employing conventional synthetic methods. Thus, for example, a chromium (III) halide can be reacted with an alkali metal carboxylate, or a chromium (III) oxide can be reacted with a carboxylic acid salt to provide the chromium (III) carboxylate. Most of the chromium (III) carboxylates are known compounds and a few of them like chromium acetate, which is preferred for use herein, and chromium naphthenate are commercially available. Other chromium (III) carboxylates which can be utilized herein for reaction with aluminum alkoxides include chromium propionate, chromium butyrate, chromium valerate, chromium succinate, chromium octoate, chromium oleate, chromium palmitate, chromium stearate, chromium behenate, chromium 2-ethylhexoate, chromium cyclopentane carboxylate, chromium cyclohexane carboxylate, chromium benzoate, chromium phthalate, chromium toluate, chromium naphthenate, and so forth.

The chromium (III) carboxylate is reacted with any one of several known aluminum alkoxides such as aluminum methoxide, aluminum ethoxide, aluminum isopropoxide, and aluminum sec-butoxide with the last named being preferred.

This reaction is carried out in an inert organic, and preferably anhydrous, solvent medium, as for example, an aromatic hydrocarbon such as benzene, toluene, xylene, an aliphatic hydrocarbon such as hexane, heptane, etc., a halogenated hydrocarbon such as chloroform, dichloromethane, etc., or a mixture of such solvents. Osgan et al., *Polymer Letters,* Volume 5, pages 789–792 (1967), propose that the reaction of a metal alkoxide with a metal carboxylate to provide catalysts for the insertion polymerization of epoxides involves an ester elimination and can be generalized according to the equation

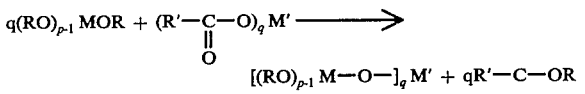

wherein R and R' are alkyl moieties, M and M' are metals, $p$ is equal to the valence of M, and $q$ is equal to the valence of M'. According to this reaction, an aluminum alkoxide would be expected to react with a chromium carboxylate as follows:

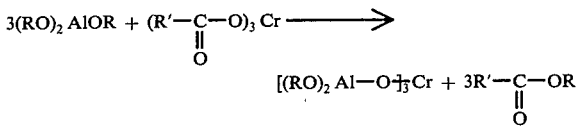

wherein R and R' are alkyl moieties. Osgan et al. report that this reaction leads, through a secondary decomposition reaction, to a mixture of higher condensed species. At present, the structures of the reaction products of chromium (III) carboxylates with aluminum alkoxides are not known with certainty.

Deposition of the chromium (III) reaction products can be carried out in a known or conventional manner, as for example, by vapor coating or by impregnating the support with solutions of the compounds in suitable inert solvents. Such solvents include the aliphatic and aromatic solvents cited above in which the chromium (III) reaction products are prepared. It is preferred to add the chromium (III) solution to a thoroughly wetted slurry of support material contained in an anhydrous organic liquid which can be the same as, or different from, the solvent for the chromium (III) reaction product. Thus, for example, a toluene solution of chromium (III) reaction product can be added to a slurry of support material in toluene. The reaction product may be preformed, or the components separately coated on the support in which case the reaction product will be formed in situ.

If the catalysts herein are to be modified by the further addition of an aluminum alkoxide, it is preferred that the latter be deposited only after the deposition of the chromium (III) reaction product upon the support material. It has been found that such sequential deposition of catalyst components provides catalysts which promote the formation of olefin polymers having substantially higher melt indices than those prepared with catalysts in which the chromium (III) reaction products and aluminum alkoxide modifiers are simultaneously deposited upon the support material at the same total aluminum alkoxide level.

The most effective catalysts have been found to be those containing the chromium (III) compound in an amount such that the amount of chromium by weight based on the weight of the support is from about 0.25 to about 2.5% and preferably is from about 0.5 to about 1.25%, although amounts outside these ranges still provide operable catalysts. The total amount of aluminum present in the chromium (III) reaction product, and if employed, the aluminum alkoxide modifier, should be sufficient to provide from about 0.1 to about 10% of aluminum by weight based on the weight of the support and preferably, from about 0.5 to about 5.5% although other amounts outside of these ranges can be used to prepare operable catalysts.

After the chromium (III) reaction product and, optionally, the aluminum alkoxide, have been deposited on the inorganic support, the support is calcined, i.e. heated, in a non-reducing atmosphere, preferably in an oxygen containing atmosphere, at a temperature above about 300° C. up to the decomposition temperature of the support. Typically, the supported compositions are calcined at a temperature of from about 800° C. to about 1000° C. The calcination period can widely vary, depending on the calcination temperatures employed and can be from about one-half hour to about 50 hours or more. Generally, calcination is carried out over a period of from about 2 to about 12 hours with approximately 4 to 6 hours being typical. The non-reducing atmosphere, which is preferably air or other oxygen-containing gas, should be dry and preferably should be dehumidified down to a few parts per million (ppm) of water to obtain maximum catalyst activity. Typically, air used in the procedure described in this application is dried to less than 2–3 ppm of water.

The calcined supported chromium (III) catalysts of the present invention can, if desired, be used in combination with known and conventional metallic and/or non-metallic olefin polymerization catalyst components. Thus, for example, the following metallic reducing agents can be used herein: trialkyl aluminums such as triethyl aluminum, triisobutyl aluminum; alkyl aluminum halides; alkyl aluminum alkoxides; dialkyl zinc; dialkyl magnesium; metal borohydrides including those of the alkali metals, especially sodium, lithium and potassium, and of magnesium, beryllium and aluminum. The non-metal reducing agents include alkyl boranes such as triethyl borane, triisobutyl borane, and trimethyl borane and hydrides of boron such as diborane, pentaborane, hexaborane and decaborane. The foregoing metallic and non-metallic compounds can be combined with the chromium (III) supported catalyst herein prior to being fed to an olefin polymerization reactor or these two components can be fed separately to an olefin polymerization reactor.

In proportioning the amount of metallic or non-metallic compound to the amount of chromium (III) compound used in the catalyst systems of the present invention, fairly wide latitude is available, but some guidelines have been established consistent with good yield, favorable polymer properties and economic use of materials. For example, in the use of metallic and/or non-metallic reducing agents with an amount of chromium compound sufficient to yield about 1% chromium by weight of the support, the parameters set forth below are representative. The atomic ratios are based upon a calculation of the metal in the metallic reducing agent and/or the non-metal in the non-metallic reducing agent versus the chromium content present in the chromium (III) compound on the support.

For example, based upon a catalyst composition containing about 1% by weight of Cr based upon the weight of the support, the preferred amount of an organometallic reducing agent for use therewith, e.g., triisobutyl aluminum (TIBAL), is about 11.4% by weight and equivalent to an Al/Cr atomic ratio of about 3/1. The preferred range of atomic ratios of Al to Cr is from about 0.5/1 to about 8/1, or from about 1.9 to about 30% by weight TIBAL. The overall practicable limits of TIBAL in terms of the Al/Cr atomic ratio are from about 0.1/1 to 20/1, and in terms of weight are from about 0.4 to about 75% by weight.

Another example of an organometallic reducing agent for use in conjunction with the catalyst composition of the present invention is triethyl aluminum. Again based upon a catalyst composition containing about 1% by weight of Cr based upon the weight of the support, the preferred amount of triethyl aluminum (TEA) is about 6.6% by weight based upon the weight of the support giving an Al/Cr atomic ratio of about 3/1. The preferred range of atomic ratios of Al to Cr is from about 0.5/1 to about 8/1, or from about 1.1 to about 18% by weight of TEA. The overall practicable limits of TEA, in terms of an Al/Cr ratio, are from about 0.1/1 to 20/1, and in terms of weight are from about 0.22 to about 44% by weight.

Triethyl boron (TEB) may be taken as the preferred example of the proportions of non-metallic reducing agent for use in conjunction with the catalyst composition of the present invention. Again based upon a catalyst composition containing about 1% by weight of Cr based upon the weight of the support, the preferred amount of TEB is about 5% by weight based upon the weight of the support giving a B/Cr atomic ratio of about 2.7/1. The preferred range of atomic ratios of B to Cr is from about 0.1/1 to 10/1, or from about 0.19 to about 19% TEB. The overall practicable limits, in terms of a B/Cr ratio, are from about 0.01/1 to about 20/1, and in terms of weight, are from about 0.02 to about 38% by weight based upon the weight of the support.

As indicated above, the catalyst compositions of this invention are amenable to use with conventional polymerization processes for olefins, in particular alphaolefins having 2 to 10 carbon atoms and are suitable for polymerization effected under temperature and pressure conditions generally employed in the art, e.g., temperatures of from about 40° to about 200° C. and preferably from about 70° to 110° C., and pressures of from 200 to 1000 psig and preferably from 300 to 800 psig, as are used in slurry or particle form polymerizations.

A series of olefin polymerizations, the results of which are reported below, were carried out to demonstrate the ability of the novel catalyst systems of the present invention to produce polymers having enhanced physical properties such as increased melt indices. The polymerizations were carried out in a stirred autoclave using isobutane as a diluent. The supported chromium (III) compound, the additional aluminum alkoxide where used, and the reducing agent where used, is added along with the isobutane solvent to a stirred one gallon autoclave. The contents of the stirred autoclave are then heated to the polymerization temperature, i.e., 88° to 108° C. Hydrogen is added and then the ethylene is added to give 10 mole percent in the liquid phase at which time the total pressure will be from about 425 to 455 psig. Polymerization begins almost immediately as noted by the ethylene coming from the ethylene demand supply system to the reactor. After approximately 1 hour of polymerization, the reaction is terminated by dropping the reactor contents into a pressure let-down system. The melt index (MI) and the high load melt index (HLMI) of the polymers prepared were determined using ASTM D-1238 (conditions E and F respectively).

While the following examples are especially referenced to the use of the reaction product of chromium (III) acetate and aluminum sec. butoxide in a supported catalyst for polymerizing ethylene, other chromium (III) reaction products can also be used for the polymerization of ethylene and other alpha-olefins with good results.

EXAMPLES 1 to 18

I. Catalyst Preparation Procedure (A) Chromium (III) acetate (1 mole) and aluminum sec-butoxide (4 moles) were reacted in dichloromethane at room temperature to yield a soluble chromium (III) compound. This procedure was repeated using 8 moles of aluminum sec-butoxide. The reaction products are not recovered from their solutions but the latter are employed directly in deposition step B.

(B) Microspheroidal silica gel having a pore volume of about 2.5 cc/g prepared in accordance with U.S. Pat. No. 3,652,215 is added to a 2000 ml. three-neck round bottom flask equipped with a stirrer, nitrogen inlet and y-tube with water condenser. A nitrogen atmosphere is maintained during the coating operation. Dichloromethane is then added to the flask containing the silica gel and stirring is commenced to insure uniform wetting of the gel. The chromium (III) acetate/aluminum sec-butoxide reaction product prepared in step A (Cr/Al = 1:4) is then added to the flask in sufficient quantity to provide a dry coated catalyst containing about 1% by weight of Cr based on weight of the support. The supernatant liquid is removed by filtration or distillation at reduced temperature and the coated gel is dried in a rotary evaporator at 60° C. and with 29 inches of vacuum. This procedure is repeated with the other reaction media of step A (Cr/Al = 1:8).

(C) In a manner similar to the deposition procedure in step B, the support impregnated with the chromium (III) reaction product of step A (Cr/Al = 1:4) is impregnated with a further amount of aluminum sec. butoxide to provide a total Cr/Al of 1:8.

(D) To heat activate the catalyst compositions prepared in steps B and C, the supported catalysts are each placed in a cylindrical container and fluidized with dry air at 0.20 feet per minute lineal velocity while being heated to a temperature of 900° C. and held at this temperature for 6 hours. The activated supported catalysts are recovered as powders.

II. Polymerization Results

Table I which follows sets forth the results of a series of polymerizations of 10 mole percent ethylene employing each of the above supported catalysts together with other catalyst components as indicated. The polymerizations were carried out at about 90° C.

TABLE I

| | | PRODUCTIVITY | | POLYETHYLENE (PE) POWDER PROPERTIES | | |
|---|---|---|---|---|---|---|
| SAMPLE | CATALYST[1] | gPE/g CATALYST/HR. | $H_2$(PSI) | MI | HLMI | HLMI/MI |
| 1 | A | 707 | 30 | 1.7 | 130 | 77 |
| 2 | A | 545 | 120 | 5 | 330 | 66 |
| 3 | B | 575 | 30 | 12.1 | N.M.[2] | — |
| 4 | B | 432 | 120 | 122 | N.M. | — |
| 5 | C | 607 | 30 | 2.7 | 194 | 72 |
| 6 | C | 589 | 120 | 4.3 | 283 | 66 |
| 7 | D | 586 | 30 | 8.3 | 622 | 75 |
| 8 | D | 573 | 120 | 11.4 | 866 | 76 |
| 9 | B | 634 | 30 | 6.5 | 390 | 60 |
| 10 | B | 361 | 120 | 29 | N.M. | — |

[1]A = Prepared by contacting 1 mole chromium (III) acetate with 4 moles aluminum sec-butoxide (0.9% Cr + 1.85% Al by weight of catalyst).
B = Same as A but with sequential deposition of additional 4 moles aluminum sec-butoxide (0.9% Cr + 3.7% Al by weight of catalyst).
C = Prepared by contacting 1 mole chromium (III) acetate with 8 moles aluminum sec-butoxide (0.9% Cr + 3.7% Al by weight of catalyst).
D = Prepared by contacting 1 mole chromium (III) acetate with 1 mole titanium butoxide and 4 moles aluminum sec-butoxide followed by deposition of 4 moles aluminum sec-butoxide (0.9% Cr + 0.9% Ti + 3.7% Al by weight of catalyst).
All catalysts contained 0.5 cc triethylborane in hexane/g catalyst (B/cr≈3/1).
[2]N.M. = No measurements possible.

As these data show, substantially higher melt indices are obtained at Al/Cr ratios of 8:1 when the additional aluminum alkoxide is deposited upon the support after the chromium (III) reaction product has been deposited (catalyst B) rather than with the deposition of the chromium (III) reaction product (catalyst C).

An additional series of polymerizations employing several of the same catalysts and reaction conditions of Table I were carried out. The results are set forth in Table II as follows:

TABLE II

| | | PRODUCTIVITY | | | POLYETHYLENE (PE) POWDER PROPERTIES | | |
|---|---|---|---|---|---|---|---|
| SAMPLE | TABLE I CATALYST | gPE/g CATALYST HR. | gPE/g Cr/ HR. | $H_2$(PSI) | MI | HLMI | HLMI/MI |
| 11 | A | 609 | 67,666 | 30 | 1.5 | 129 | 86 |
| 12 | A | 429 | 47,666 | 30 | 1.8 | 134 | 74 |
| 13 | A | 805 | 89,443 | 30 | 1.5 | 113 | 75 |
| 14 | A | 392 | 43,555 | 30 | 1.9 | 151 | 79 |
| 15 | A | 474 | 52,666 | 120 | 5.3 | 378 | 71 |
| 16 | A | 595 | 66,110 | 120 | 4.8 | 263 | 55 |
| 17 | A | 596 | 66,221 | 120 | 2.6 | 183 | 70 |
| 18 | C | 714 | 79,332 | 30 | 3.1 | 187 | 60 |
| 19 | C | 826 | 91,777 | 30 | 2.4 | 161 | 67 |
| 20 | C | 485 | 53,888 | 30 | 2.1 | 167 | .79 |
| 21 | C | 605 | 67,221 | 120 | 3.8 | 277 | 73 |
| 22 | C | 574 | 63,777 | 120 | 4.9 | 315 | 64 |
| 23 | C | 642 | 71,333 | 120 | 4.2 | 246 | 58 |
| 24 | B | 459 | 50,999 | 30 | 7.1 | 506 | 71 |
| 25 | B | 502 | 55,277 | 30 | 8.6 | 473 | 55 |
| 26 | B | 437 | 48,555 | 30 | 29.6 | 3360 | 114 |
| 27 | B | 527 | 58,555 | 120 | 14.1 | 1113 | 79 |
| 28 | B | 559 | 62,111 | 120 | 19.2 | 1290 | 67 |
| 29 | B | 470 | 52,221 | 120 | 40 | 3480 | 87 |
| 30 | B[1] | 399 | 44,333 | 30 | 52.8 | 3564 | 68 |
| 31 | B[1] | 336 | 37,333 | 30 | 27 | 2004 | 74 |
| 32 | B[1] | 550 | 61,110 | 120 | 31.8 | 2015 | 63 |
| 33 | B[1] | 585 | 64,999 | 120 | 101 | 5130 | 51 |

B[1] = Heat activated at 1725° F.
All catalysts contained 0.5cc triethylborane in hexane/g catalyst (B/cr≈3/1).

The like data of Table I, these data also show improved melt indices when the total aluminum deposited upon the support material is deposited in two equal portions: one portion as part of the chromium (III) reaction product and the other portion as sequentially deposited aluminum alkoxide. In addition an increase in the heat activation temperature leads to a further improvement in melt indices for the half and half aluminum coatings.

What is claimed is:

1. A process for the preparation of an olefin polymerization catalyst which comprises:

(a) depositing on an inorganic support material, the chromium (III) compound preformed obtained from the reaction of a chromium (III) carboxylate with an aluminum alkoxide; and (b) heating said support material having the chromium (III) reaction product deposited thereon in a non-reducing atmosphere above 300° C. up to the decomposition temperature of the support material.

2. The process of claim 1 wherein an aluminum alkoxide is deposited upon the support material after the deposition of the chromium (III) reaction product but prior to the heating step.

3. The process of claim 1 wherein the chromium (III) carboxylate reacted with aluminum alkoxide is chromium (III) acetate.

4. The process of claim 1 wherein the chromium (III) compound is reacted with aluminum sec-butoxide.

5. The process of claim 1 wherein the chromium (III) reaction product is obtained from the reaction of chromium (III) acetate with aluminum sec-butoxide.

6. The process of claim 2 wherein the aluminum alkoxide is aluminum sec-butoxide.

7. The process of claim 1 wherein the heat-treated polymerization catalyst is combined with a metallic or non-metallic reducing agent, the metallic reducing agent being selected from among the trialkyl aluminums, alkyl aluminum halides, alkyl aluminum alkoxides, dialkyl zinc, dialkyl magnesium, and the alkali metal and magnesium, beryllium and aluminum borohydrides, and the non-metallic reducing agent being selected from among the alkyl boranes and hydrides.

8. The process of claim 1 wherein the inorganic support material is a silica xerogel having a surface area in the range of 200 to 500 m$^2$/g, a pore volume greater than about 2.0 cc/g and a major portion of the pore volume being provided by pores having diameters in the range of 300 to 600 A.

9. The process of claim 1 wherein the heating step is carried out in air at from about 800° C. to about 1,000° C. for from about 4 to about 6 hours.

10. A heat activated olefin polymerization catalyst comprising the preformed reaction product of a chromium (III) carboxylate and an aluminum alkoxide on an inorganic oxide support, the catalyst comprising 0.25 to 2.5 percent of Cr by weight of the support.

11. The olefin polymerization catalyst of claim 10 wherein the chromium (III) reaction product is obtained from the reaction of chromium (III) acetate with aluminum sec-butoxide.

12. The olefin polymerization catalyst of claim 10 combined with a metallic or non-metallic reducing agent, the metallic reducing agent being selected from among the trialkyl aluminums, alkyl aluminum halides, alkyl aluminum alkoxides, dialkyl zinc, dialkyl magnesium, and the alkali metal and magnesium, beryllium and aluminum borohydrides, and the non-metallic reducing agent being selected from among the alkyl boranes and hydrides.

13. The olefin polymerization catalyst of claim 10 wherein the inorganic support material is a silica xerogel having a surface area in the range of 200 to 500 m$^2$/g, a pore volume greater than about 2.0 cc/g and a major portion of the pore volume being provided by pores having diameters in the range of 300 to 600 A.

14. In the catalyzed polymerization of alpha olefins the improvement which comprises employing as said catalyst the catalyst of claim 13.

15. The process of claim 1 wherein the aluminum alkoxide is represented by the general formula (RO)$_2$AlOR wherein R is alkyl.

* * * * *